C. G. GRAVES.

WARDROBE TRUNK.

APPLICATION FILED MAY 31, 1917.

Reissued Aug. 28, 1917.

14,346.

Inventor

CHURCHILL G. GRAVES

By Watson E. Coleman

Attorney

UNITED STATES PATENT OFFICE.

CHURCHILL G. GRAVES, OF ROANOKE, VIRGINIA, ASSIGNOR TO THE SEWARD TRUNK AND BAG COMPANY, OF PETERSBURG, VIRGINIA, A CORPORATION OF VIRGINIA.

WARDROBE-TRUNK.

14,346. Specification of Reissued Letters Patent. Reissued Aug. 28, 1917.

Original No. 1,212,139, dated January 9, 1917, Serial No. 99,312, filed May 23, 1916. Application for reissue filed May 31, 1917. Serial No. 172,105.

*To all whom it may concern:*

Be it known that I, CHURCHILL G. GRAVES, a citizen of the United States, residing at Roanoke, in the county of Roanoke and State of Virginia, have invented certain new and useful Improvements in Wardrobe-Trunks, of which the following is a specification, reference being had to the accompanying drawings.

This invention relates to wardrobe trunks, and has for its primary object to provide, in connection with a trunk of this type, improved means for mounting and supporting a plurality of garment hangers in one section of the trunk, whereby the hangers may be conveniently separated and extended beyond the open side of the trunk section and all of said hangers and the garments thereon compactly held within the trunk section against relative movement when the trunk is closed.

It is a more particular object of the invention to provide hanger rails mounted upon the opposite side walls of the trunk section, and auxiliary rails mounted for relative movement upon one end of said hanger rails and adapted to be extended and locked in alinement therewith to receive the hangers, said auxiliary rails being capable of a folding or swinging movement to various angular positions within the trunk section to compress the garments.

It is also a further object of the invention to provide, in connection with a wardrobe trunk, a rack frame for the garment hangers and means for mounting the same upon the trunk walls, whereby the frame can be removed as a unit from the trunk section.

It is also a further general object of the invention to improve and simplify the construction of devices of the above character, increase the convenience and serviceability of the same in practical use, and without adding materially to the manufacturing cost of such trunks.

With the above and other objects in view, my invention consists in the novel features of construction, combination, and arrangement of parts to be hereinafter more fully described, claimed and illustrated in the accompanying drawings, in which, Figure 1 is a front elevation of a portion of a wardrobe trunk, the same being open and showing my invention applied to one of the trunk sections;

Figure 1:
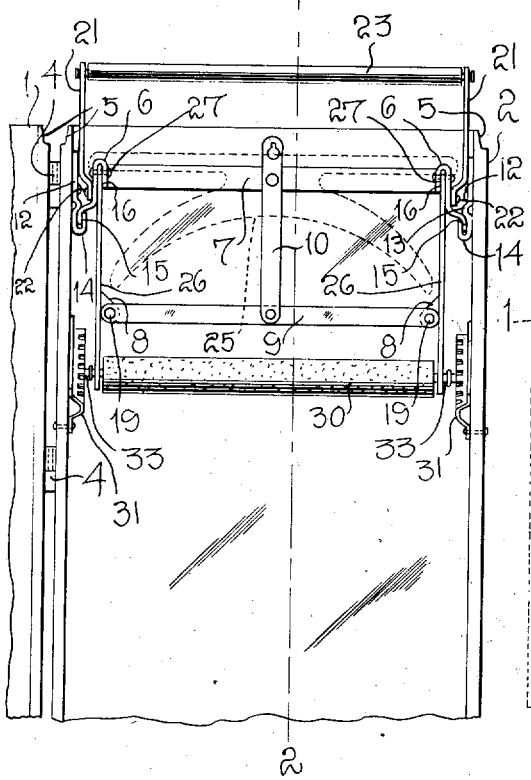

Referring in detail to the drawings, 1 and 2 respectively designate the sections of a wardrobe trunk, the trunk section 2 being provided with a top or cover 3 hinged upon the rear wall thereof. The two trunk sections 1 and 2 are hingedly connected to each other at spaced points along their adjacent vertical edges by means of the hinges, indicated at 4, which may be of any ordinary or approved construction. When the two trunk sections are closed with their open sides in abutting relation, the cover 3 may be swung over and downwardly upon the upper ends of said trunk sections to its closed position, overlapping upon the upper edges of the trunk walls at 5, and thereby serving to hold the walls of the two trunk sections against downward movement under internal pressure.

In the preferred embodiment of my invention, I provide a rack or frame consisting of the spaced hanger supporting rails 6. These rails are formed of sheet steel, and at one of their edges said rails are bent to provide the inverted U-shaped channel portions 16. The rail plates, adjacent their other edges, are laterally offset, as at 15, for a purpose to be presently explained. In the channels 16 of the hanger rails at one of their ends, the angular terminals of a connecting bar 7 are engaged and permanently secured by the rivets indicated at 17.

Obliquely disposed brace bars 8 also have one of their ends engaged in the channels 16 of the hanger rails and riveted thereto, as shown at 18. The other ends of these brace bars are riveted, as at 19, to the opposite ends of a horizontal bar 9. This bar is centrally connected by the vertical tie bar 10 to the connecting bar 7 between the hanger rails.

To the opposite side walls of the trunk section 2, the brackets 12 are securely riveted, each of said brackets being in the form of a rectangular, metal plate and having its lower edge upturned, as at 14, and spaced from the bracket plate to provide a channel or seat for the lower edge of one of the hanger rails 6. The bracket plate 12 is also provided in spaced relation to the upper edge of the returned portion 14 thereof with a single, longitudinally extending corrugation or rib 13. The offset lower edge of the hanger rail which is slidably fitted into the seat of the bracket, is disposed beneath this rib or corrugation which acts as a stop and prevents vertical movement of the hanger rail with respect to the bracket.

Figure 2:
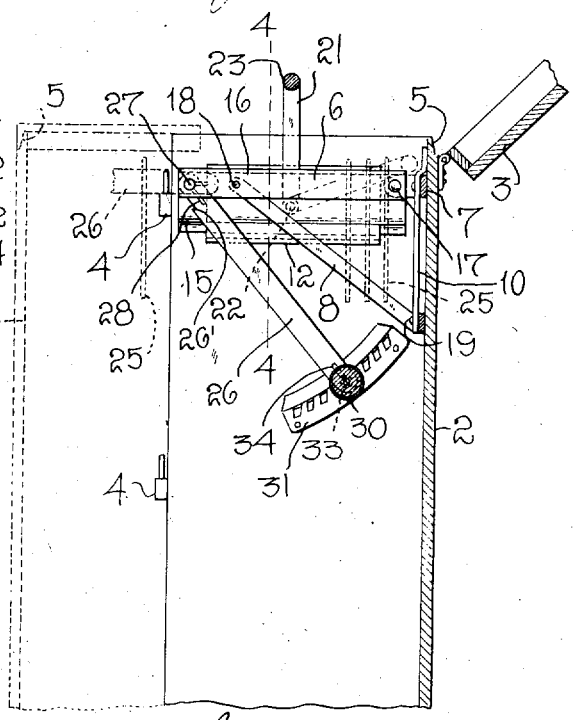
Fig. 2 is a vertical section taken on the line 2—2 of Fig. 1.
Figure 3:
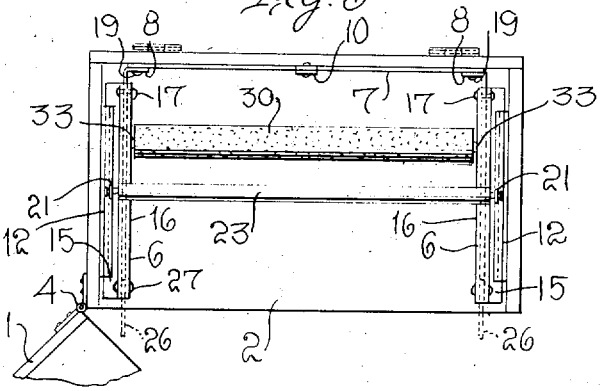
Fig. 3 is a plan view thereof.
Figure 4:
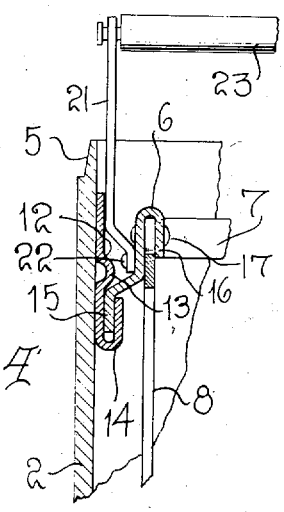
Fig. 4 is an enlarged detail section taken on the line 4—4 of Fig. 2.

To the outer sides of the rails 6, above the offset edges 15 thereof, the bail arms 21 are pivotally connected at one of their ends, as shown at 22, a cross bar or rod 23 being engaged in the other ends of these arms. This bail provides convenient means for carrying the hanger rack or frame after it has been removed from the trunk section, and when the trunk is closed, this bail is swung downwardly to the position shown in dotted lines in Fig. 2 of the drawing. If desired, however, it will be understood that this bail can be dispensed with.

In order that the hangers and the garments may be extended beyond the open side of the trunk section, I provide the auxiliary rails 26 which are longitudinally slotted at one of their ends, as at 28. These slotted ends of the rails 26 are engaged in the outer edges of the seats 16 upon which the hangers, indicated at 25, have free sliding movement, and rivets 27 are fixed in the hanger rails and disposed through the slots 28 to limit the rectilinear movement of the auxiliary rails 26 with respect to the rails 6 and to also serve as pivots upon which said auxiliary rails may be swung into or out of the trunk section. In the illustrated embodiment of my invention, I have shown a rubber covered roller 30 mounted between the other ends of the auxiliary rails 26. The trunnions 33 on the ends of said roller are mounted for shifting movement in slots 34 provided in the auxiliary rails 26, whereby said trunnions may be engaged in the notches or recesses of bracket plates 31 fixed to the side walls of the trunk section or readily disengaged therefrom. If desired, it is obvious that the roller 30 can be dispensed with and the auxiliary rails 26 connected by means of a rigid cross bar in lieu of said roller.

In the use of the invention as above described, when it is desired to remove a selected garment from the trunk, the roller trunnions are disengaged from the notches in the brackets 31 and the hanger rails 26 then swung outwardly and upwardly to a horizontal position in alinement with the main hanger rails 6 of the rack or frame mounted within the trunk section. The auxiliary rails 26 are now forced inwardly to extend their slotted ends within the outer ends of the channel-shaped portions 16 of the rails 6, such movement being limited by the shoulders 26′ in the rails 26 abutting against the outer ends of the respective hanger rails 6. Thus, the breaking or distortion of the guide rivets 27 by violent impact of the rails 26 therewith in the inward movement of the same, is obviated. When the rails 26 are thus positioned with respect to the rails 6, it is manifest that as the ends of the auxiliary rails 26 are disposed beneath the curved seat portions of the rails 6, the former are supported against downward swinging movement. The hangers 25 may now be readily extended outwardly from the rails 6 and upon the auxiliary hanger rails 26 so that the garments may be separated and the desired selection made. In closing the trunk, the hangers 25 are forced inwardly against the rear wall of the trunk section 2 and the hanger rails 26 are then pulled outwardly to the limit of their movement upon the rivets 27 and swung downwardly and inwardly to an angular position within the trunk section 2, the roller between the rails 26 exerting a compressing action against the garments below the hangers. The auxiliary rails are then locked in connection with the keepers 31 so as to retain the same in such folded position. It will also be seen that the auxiliary rails 26, when thus locked, will effectually prevent any outward sliding or shifting movement of the rails 6 upon the supporting brackets 12 so that all parts, as well as the garments, will be securely held against relative movement in the handling of the trunk in moving the same from place to place.

The entire rack or frame, together with the auxiliary hanger rails 26, may, of course, be easily and quickly removed from the trunk section by simply sliding the rails 6 outwardly in the fixed bracket members 12. For this purpose, the pivoted bail above referred to may be conveniently employed. When in its applied position, the horizontal bars 7 and 9 of the rack or frame engage closely against the inner face of the rear wall of the trunk section so that a maximum space is provided for the reception of the garments. In the illustrated embodiment, the roller 30, after it is locked against outward swinging movement in the keepers 31, may be rotated to exert a downward drawing pull on the garments, thus preventing the same from bunching or wrinkling.

From the foregoing description, taken in connection with the accompanying drawing, the construction, manner of use, and several advantages of my invention will be clearly and fully understood. It has been found in practice that the improved mounting and arrangement of the auxiliary hanger rails affords a very simple and effective means for compactly holding the garments against relative shifting movement on the main hanger support, and also enables the user to obtain a maximum separation between the various garments so that the selected garment and the hanger can be very easily and quickly removed or replaced in position. The device being of very simple construction will not add materially to the manufacturing cost of trunks of this type and is also very strong and durable so that it will withstand violent shocks or jars to which the trunk may be subjected in transportation.

While I have herein shown and described one practical embodiment of the invention, it is to be understood that the same is susceptible of a great many modifications in the form, proportion, and arrangement of the several parts, and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a trunk section, of hanger rails mounted upon the side walls of the trunk section, auxiliary hanger rails mounted upon said first named rails for swinging movement and provided with clothes pressing means, said first named rails and the auxiliary rails having co-acting means to support the auxiliary rails in extended relation to the first named rails and in line with the latter, said auxiliary rails being adapted to be swung into the open side of the trunk section to various angular positions to compress the garments suspended from the hangers, and means to lock the auxiliary rails against swinging movement from a clothes pressing position.

2. The combination with a trunk section, of means for slidably supporting a plurality of hangers within the trunk section, an auxiliary hanger support mounted for vertical swinging movement, said auxiliary support having means to co-act with the supporting means within the trunk, whereby the auxiliary support is sustained in an extended, horizontal position to receive the garment hangers, said auxiliary support being adapted to be swung into the trunk section to various angular positions to exert a compressing action upon the garments, and means for locking the auxiliary support in a clothes pressing position.

3. The combination with a trunk section, of means for slidably supporting a plurality of hangers within the trunk section, an auxiliary hanger support mounted upon said first named support for vertical swinging and rectilinear shifting movement, said auxiliary support having means to co-act with means on the support within the trunk section when the auxiliary support is extended to its operative position from the trunk section and shifted in one direction upon the relatively fixed support whereby said auxiliary support is sustained in extended position, said auxiliary support being adapted to be swung into the trunk section to various angular positions to compress the garments suspended from the hangers, and means for locking the auxiliary support in a clothes pressing position.

4. The combination with a trunk section, of a hanger rack, means for removably supporting the hanger rack within the trunk section, an auxiliary, extensible hanger support carried by said rack, and means for locking said support in a folded position within the trunk section, whereby the removable rack is held against shifting movement with respect to the trunk section.

5. The combination with a trunk section, of a hanger rack, means for slidably supporting the rack upon the opposed walls of the trunk section, an auxiliary hanger support pivotally connected to the rack for swinging movement and movable to an extended operative position from the trunk section, and means for locking said auxiliary hanger support within the trunk section, whereby the hanger rack is held against sliding movement upon the trunk wall.

6. The combination with a trunk section, of a hanger rack, a relatively movable, extensible hanger support connected to said rack, means secured to the side walls of the trunk section and supporting the hanger rack and the support for removal as a unit from the trunk section, and means for locking the relatively movable support within the trunk section in angular relation to the rack to hold the latter against shifting movement with respect to the trunk section.

7. The combination with a trunk section, of a relatively stationary hanger support mounted within said trunk section, a movable auxiliary hanger support having means to co-act with parts of the stationary support whereby the movable hanger support is sustained in an extended operative position from the open side of the trunk section, said latter support being movable into the trunk section beyond a perpendicular position into angular relation to the stationary hanger support and having a part for pressing engagement with the clothes, and means for locking the movable hanger support in the latter position.

In testimony whereof, I hereunto affix my signature this 19th day of May, 1917.

CHURCHILL G. GRAVES.